United States Patent
Zutler et al.

(10) Patent No.: US 11,724,728 B2
(45) Date of Patent: Aug. 15, 2023

(54) REINFORCED NESTING SHOPPING CART

(71) Applicant: GLOBAL INDUSTRIAL DISTRIBUTION INC., Port Washington, NY (US)

(72) Inventors: Bruce Zutler, Port Washington, NY (US); Kevin Chow, Port Washington, NY (US); Harry Wellington, Port Washington, NY (US)

(73) Assignee: GLOBAL INDUSTRIAL DISTRIBUTION INC., Port Washington, NY (US)

( * ) Notice: Subject to any disclaimer, the term of this patent is extended or adjusted under 35 U.S.C. 154(b) by 0 days.

(21) Appl. No.: 17/563,471

(22) Filed: Dec. 28, 2021

(65) Prior Publication Data

US 2022/0306176 A1    Sep. 29, 2022

Related U.S. Application Data

(63) Continuation-in-part of application No. 17/209,886, filed on Mar. 23, 2021, now Pat. No. 11,548,544.

(51) Int. Cl.
*B62B 3/18*  (2006.01)

(52) U.S. Cl.
CPC .................... *B62B 3/18* (2013.01)

(58) Field of Classification Search
CPC .......... B62B 3/18; B62B 3/14; B62B 3/1496; B62B 3/182; B62B 3/008; B62B 3/02; B62B 3/1464; B62B 3/1468; B62B 2202/00; B62B 2202/22; B62B 2205/30
See application file for complete search history.

(56) References Cited

U.S. PATENT DOCUMENTS

| | | | |
|---|---|---|---|
| 2,590,048 A * | 3/1952 | Sides | B62B 3/182 |
| | | | 280/33.996 |
| 2,590,285 A | 3/1952 | Wiltshire | |
| 2,596,775 A * | 5/1952 | Kasper | B62B 3/14 |
| | | | 280/33.996 |
| 2,644,695 A * | 7/1953 | Enders | B62B 3/14 |
| | | | 280/33.996 |
| 3,245,498 A * | 4/1966 | Stanley | B62B 3/148 |
| | | | 186/63 |
| 4,268,049 A | 5/1981 | Salvador | |
| 4,850,604 A * | 7/1989 | Le Marchand | B62B 3/182 |
| | | | 280/33.996 |
| 5,306,033 A * | 4/1994 | Evans | B62B 3/142 |
| | | | D34/27 |

(Continued)

FOREIGN PATENT DOCUMENTS

| | | | |
|---|---|---|---|
| CA | 2153836 A1 * | 1/1997 | |
| CN | 109131514 A | 1/2019 | |

(Continued)

*Primary Examiner* — James A Shriver, II
*Assistant Examiner* — Michael T. Walsh
(74) *Attorney, Agent, or Firm* — Troutman Pepper Hamilton Sanders LLP

(57) ABSTRACT

A nestable shopping cart has an upright frame, and a tray pivotally connected to the upright frame. The tray includes a utility position, a nested position, an inside, and an outside. Further included is a perimeter wire surrounding the tray and a tapered front. The perimeter wire surrounds the outside of the tray until the tapered front, and then the perimeter wire surrounds the inside of the tapered front.

8 Claims, 12 Drawing Sheets

(56) References Cited

U.S. PATENT DOCUMENTS

| | | | | |
|---|---|---|---|---|
| 5,324,055 A * | 6/1994 | Trubiano | ................ | B62B 3/144 |
| | | | | D34/27 |
| 5,548,911 A * | 8/1996 | Myers | ..................... | G09F 23/06 |
| | | | | 224/277 |
| 6,003,894 A * | 12/1999 | Maher | ....................... | B62B 3/14 |
| | | | | 280/639 |
| 9,085,314 B2 * | 7/2015 | Selvig | ..................... | B62B 3/182 |
| 2009/0309322 A1 * | 12/2009 | Selvig | ..................... | B62B 3/1476 |
| | | | | 280/33.996 |
| 2013/0207362 A1 * | 8/2013 | Smith | ....................... | B62B 3/14 |
| | | | | 280/47.34 |
| 2015/0053688 A1 * | 2/2015 | Peters | ....................... | B62B 5/00 |
| | | | | 220/492 |
| 2016/0107667 A1 * | 4/2016 | Eberlein | ............... | B62B 3/1476 |
| | | | | 280/33.996 |
| 2016/0257329 A1 * | 9/2016 | Sherman | ................... | B62B 5/06 |
| 2017/0080966 A1 * | 3/2017 | McMurtrey | ........... | B62B 3/1444 |
| 2021/0039700 A1 | 2/2021 | Gardner | | |
| 2021/0070341 A1 | 3/2021 | Eberlein | | |

FOREIGN PATENT DOCUMENTS

| | | | | |
|---|---|---|---|---|
| EP | 2222529 B1 * | 8/2011 | ........... | B62B 5/0006 |
| EP | 2390160 A2 | 11/2011 | | |
| FR | 2925449 A1 * | 6/2009 | ........... | B62B 5/0006 |
| JP | 2022060051 A | 4/2022 | | |
| SE | 512163 C2 * | 2/2000 | ................ | B62B 3/14 |
| WO | WO-9422705 A1 * | 10/1994 | ........... | B62B 3/1408 |

* cited by examiner

REINFORCED NESTING SHOPPING CART

CROSS-REFERENCE TO RELATED APPLICATIONS

This application is a Continuation-In-Part of U.S. application Ser. No. 17/209,886, filed Mar. 23, 2021. This application is incorporated herein by reference in its entirety.

FIELD

The present invention relates to a nestable shopping cart with enhanced stiffness.

BACKGROUND

Existing shopping carts do not have a compact storage configuration, and typically require a lot of labor work to collect and move them. Trays and/or baskets of existing shopping carts require improvements on durability.

A need exists for an improved nestable shopping cart configuration to facilitate collecting and moving many carts at one time. A need also exists for an improved tray for added durability. Embodiments of the present disclosure are directed to this and other considerations.

SUMMARY

A nestable shopping cart has an upright frame, and a tray pivotally connected to the upright frame. The tray includes a utility position, a nested position, an inside, and an outside. Further included is a perimeter wire surrounding the tray and a tapered front. The perimeter wire surrounds the outside of the tray until the tapered front, and then the perimeter wire surrounds the inside of the tapered front.

In another example, a face plate is attached to the outside of the tapered front, regardless of the position of the perimeter wire. The face plate and/or inner wire allows for a smooth transition over the ramps when the carts are nested.

Further features of the present disclosure, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, explain the principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1A:
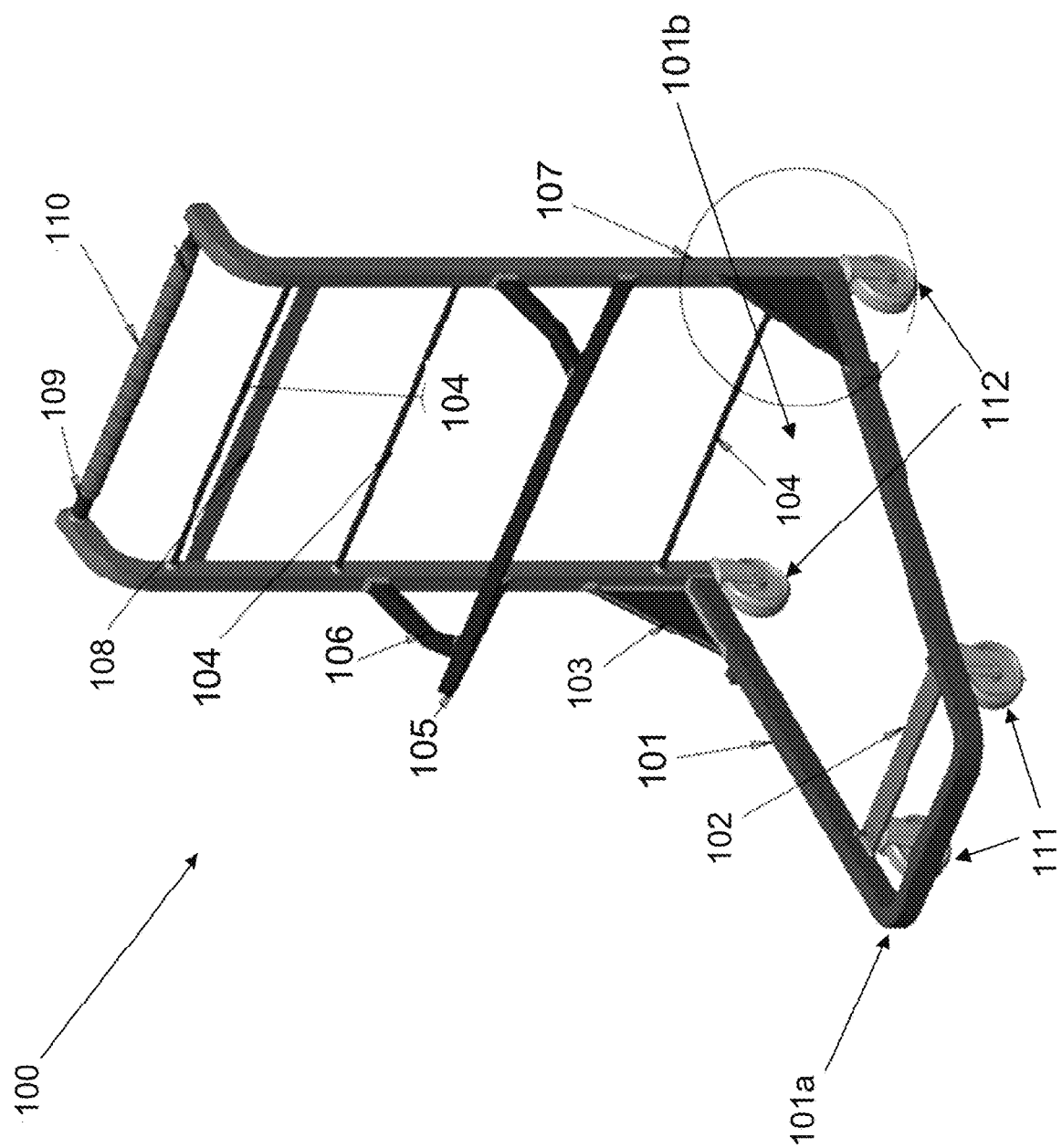
FIG. 1A is a diagram of a nestable shopping cart according to one aspect of the present disclosure.
Figure 4B:
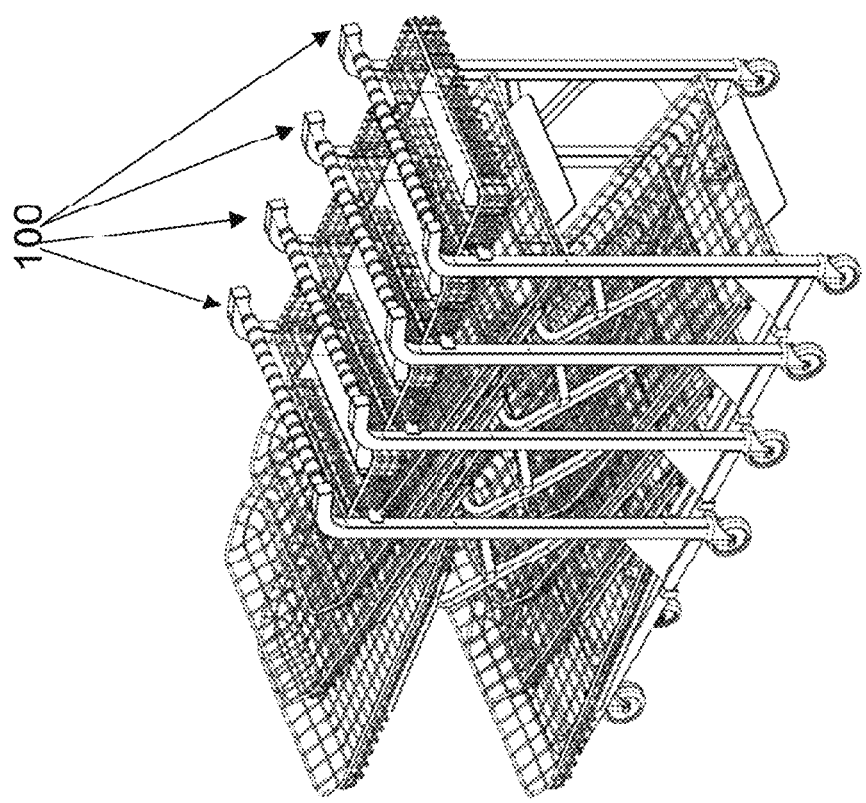
FIGS. 4A-4C illustrate a plurality of nestable shopping carts in a nesting position according to one aspect of the present disclosure.
Figure 4A:
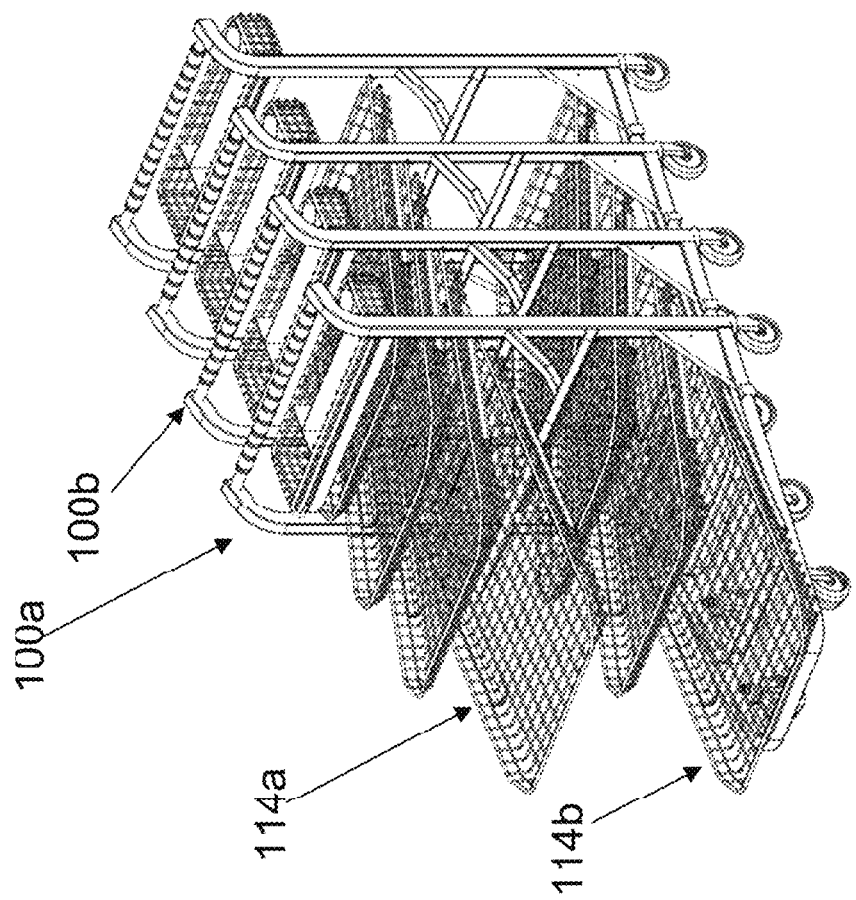
Figure 4C:
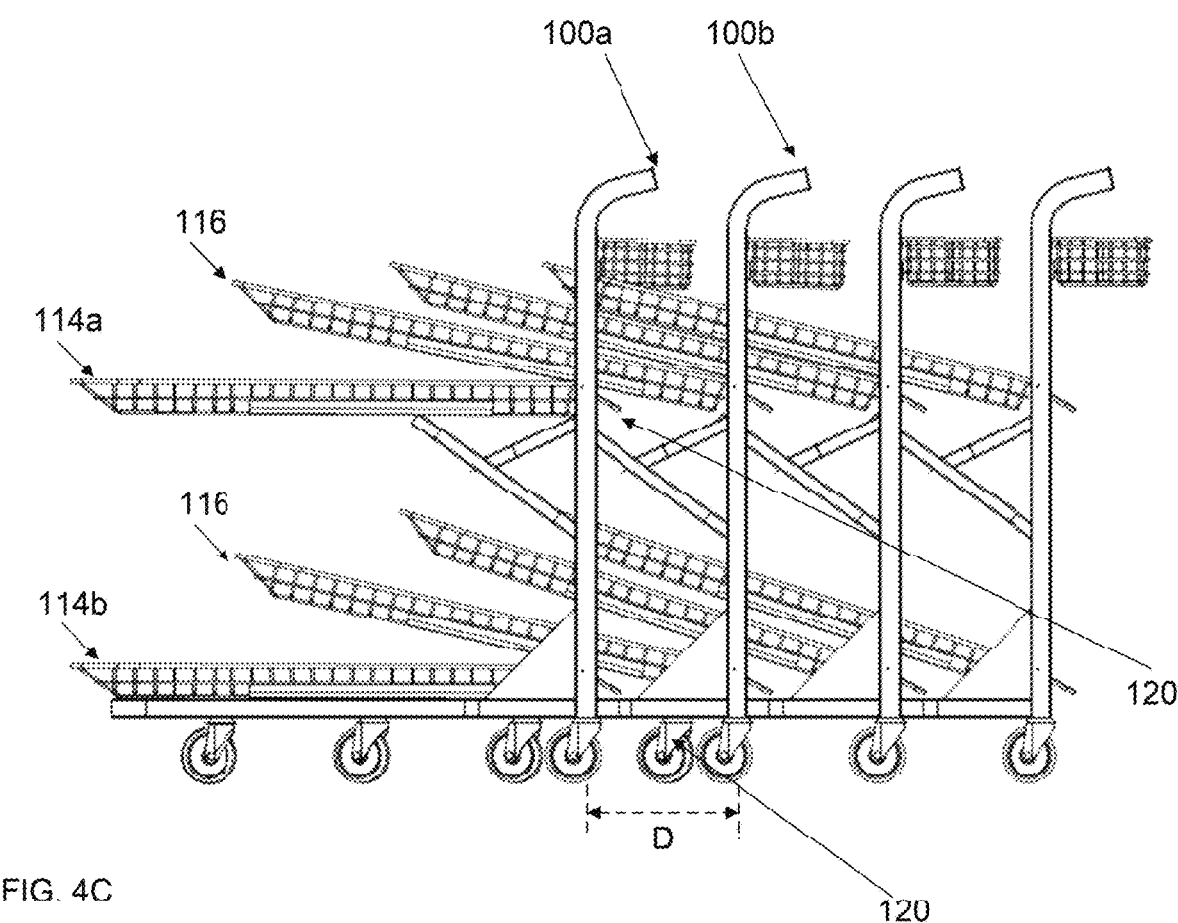

Referring to FIG. 1A, a nestable shopping cart 100 may have a bottom frame 101, a crossbar 102 mounted on the bottom frame 101, a pair of angle supports 103, three support rods 104, an upper angle support 105, a pair of tie bars 106, a pair of upright frames 107, a brace 108, a handlebar 109, a handle grip 110, and four swivel casters 111. The bottom frame 101 is "U" shaped in the plane parallel with the floor. The bottom frame has a tapered front 101a and an opening 101b faces toward the rear, or handlebar 109 side of the cart 100. The upper angle support 105 may extend out from the upright frame 107. With reference to the upper angle support 105 and the pair of tie bars 106, the adjacent side of the right angle may extend out just enough to support evenly distributed weight, and allow a tight nesting gap D as illustrated in FIG. 4C.

In one embodiment, the four swivel casters 111 may allow 360 degrees directional motion. In another embodiment, the front pair of casters 111 may be swivel casters, whereas the back pair of casters 112 may be fixed casters. In one embodiment, the front pair of casters 111 may be set back about 7 inches from the edge of the crossbar 102.

Figure 1B:
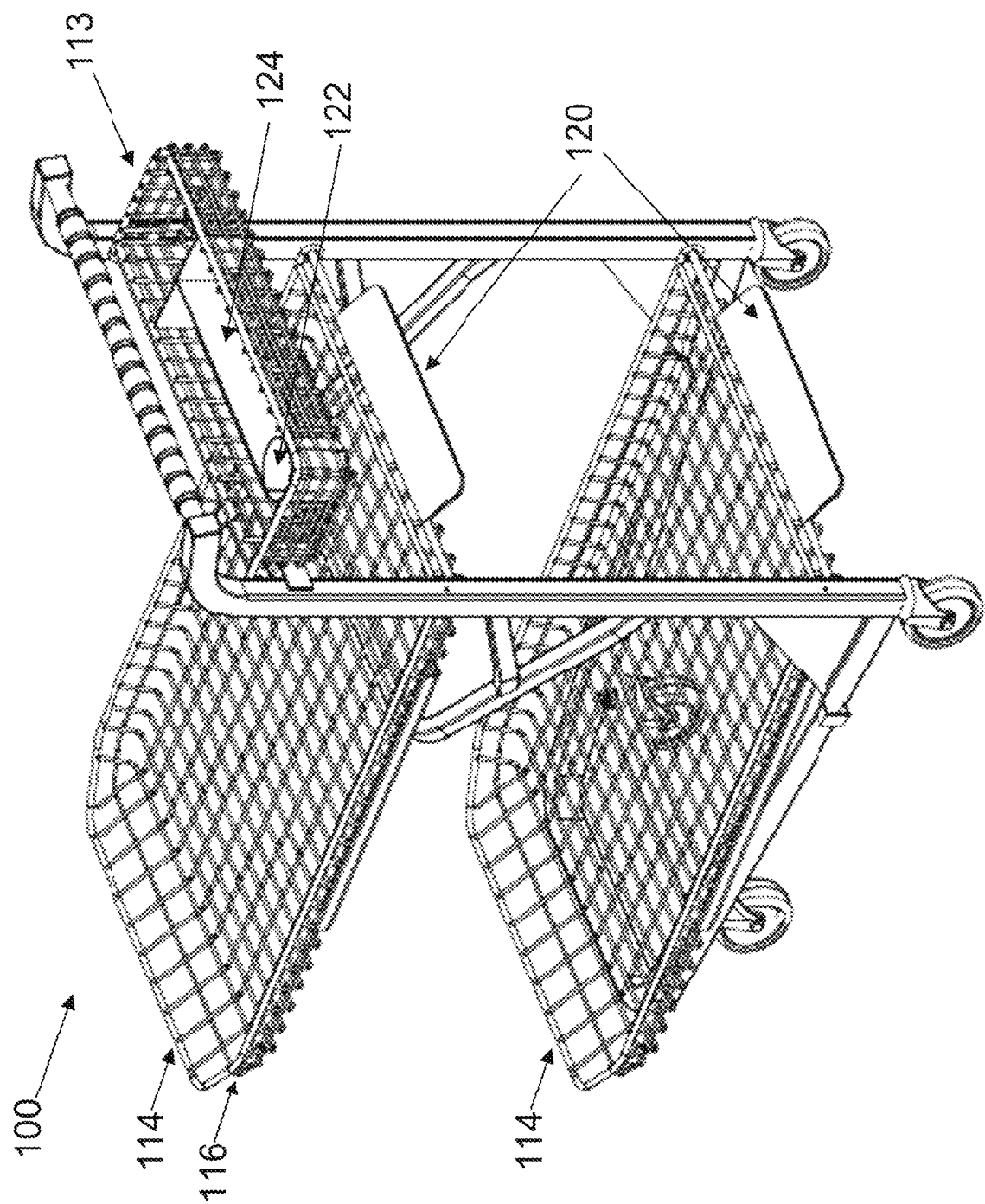
FIG. 1B illustrates a diagram of the shopping cart of FIG. 1A with trays and an upper basket mounted thereon according to one aspect of the present disclosure.

Referring to FIG. 1B, the cart 100 may have an upper basket 113 and a pair of trays or shelf baskets 114. One tray 114 may be supported by the upper angle support 105 and the tie bars 106. Another tray 114 may be supported by the bottom frame 101.

As shown in FIG. 1B, a welded slope plate 120 may be mounted to the side of each tray 114 for added durability. The upper basket 113 may include a cup holder 122 and at least one storage divider 124.

Figure 2:
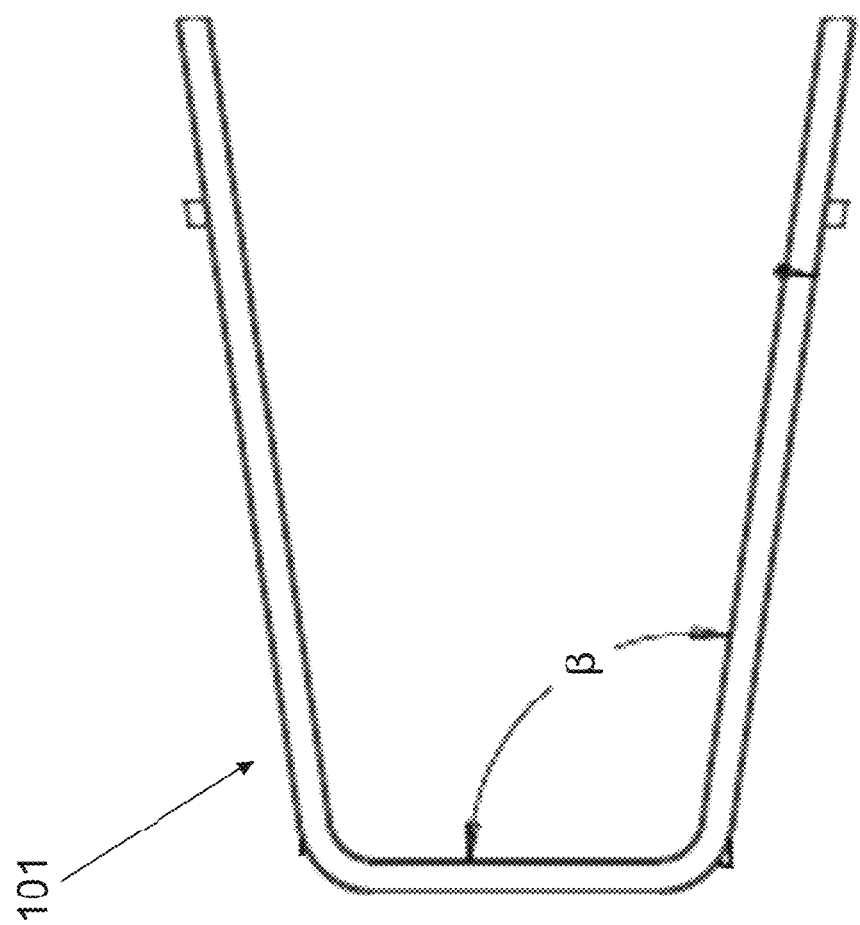
FIG. 2 illustrates a planar view of a bottom frame according to one aspect of the present disclosure.

As illustrated in FIG. 2, the bottom frame 101 may form an angle β. The angle β may be about 98.5 degrees. In another embodiment, the angle β may be about 98.5+/−0.5 degrees. The bottom frame 101 has an angle β greater than 90° to facilitate an "open" tapered shape.

Figure 3:
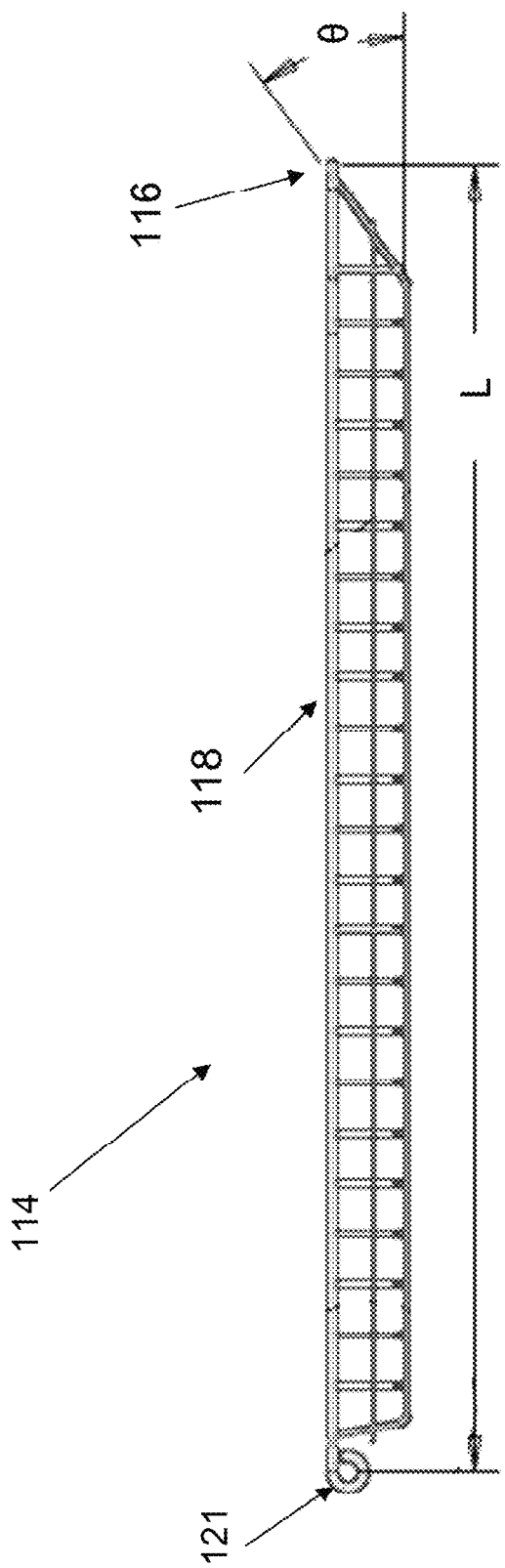
FIG. 3 illustrates a side view of a tray according to one aspect of the present disclosure.

Each tray 114 may be a stiffener plate. As illustrated in FIG. 3, each tray 114 may have a length L about 38 inches, such as 37.88 inches. Each tray 114 may exhibit a grid steel wire pattern. Each tray 114 may have a perimeter wire 118 for added structural support. The perimeter wire 118 may have a diameter of about 5/16 inches. Each tray 114 may have a tapered front 116 forming an angle θ. In one embodiment, the angle θ may be about 35 degrees. The tapered tray 114 and the welded slope plates 120 may ease nesting as illustrated in FIGS. 4A-4C. The tray 114 also includes pivot point 121. The pivot point 121 can be formed from the steel grid wire or welded on as a separate piece.

FIGS. 4A-4C illustrate a plurality of nestable shopping carts 100 in a nesting position. Each cart 100 may nest within each other in a line to facilitate collecting and moving many carts at one time. When they are nested, each pair of adjacent carts may be distanced from each other by a nesting gap D. The nesting gap D may be about 11 inches.

Turning now to assembly and use, as illustrated above, each of the trays 114 are pivotally attached to the upright frames 107 through the pivot point 121. The attachment can be individual through each hole, or a single axle can run between the two upright frames 107 and through the pivot point hole 121. Once pivoted, the top tray 114a rests on the upper angle support 105. The bottom tray 114b, attached through the pivot point 121 as above, rests on the bottom frame 101.

During use, the trays 114 are at rest and generally parallel to each other. The upper tray 114a is spaced to allow larger items to be placed without interference from the top tray 114a. Here, the trays 114 are considered to be in a utility position to allow for the loading and transport of goods in the cart 100.

During stacking, a second cart 100b is directed into the back of a first cart 100a. The tapered front 101a of the second cart 100b fits through the opening 101b of the first cart 100a to begin the nesting process. At the same time, the tapered front 116 of the trays 114 of the second cart 100b engage with the slope plates 120 of the first cart 100a. This causes the trays 114 of the second cart 100b to pivot upwards allowing the more of the second cart's 100b bottom frame 101 to nest inside the bottom frame 101 of the first cart 100a. This is clearly illustrated in FIG. 4C and allows for a small nesting gap D. This is the nested position. Note that in one example, the trays 114 pivot individually and in other examples only one can pivot, or the trays can be linked to pivot in unison.

Figure 5:
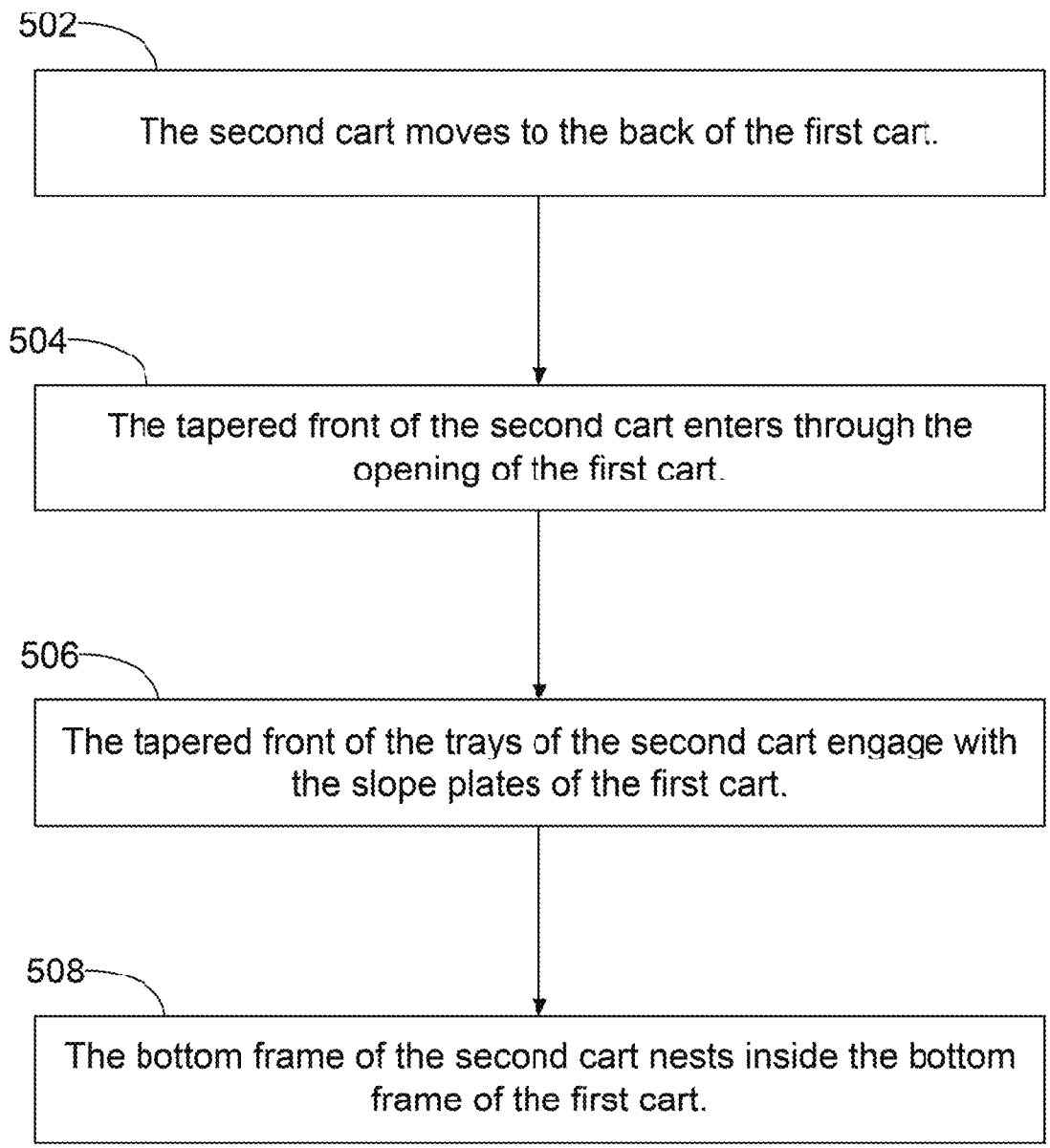
FIG. 5 is flow chart diagram of a method of use of the present invention.

FIG. 5 is a flow chart illustrating a process of nesting shopping carts. At 502, the second cart 100b moves to the back of the first cart 100a. At 504, the tapered front 101a of the second cart 100b enters through the opening 101b of the first cart 100a. At 506, which may happen at the same time as the step 504, the tapered front 116 of the trays 114 of the second cart 100b engage with the slope plates 120 of the first cart 100a, pivoting the trays 114 of the second cart 100b upwards. At 508, the bottom frame 101 of the second cart 100b nests inside the bottom frame 101 of the first cart 100a.

Referring to FIGS. 6A-6D, another example of a nestable shopping cart 200 is illustrated and can have a bottom frame 201 similar to that of the above example. The cart 200 can include a crossbar mounted on the bottom frame, a pair of angle supports 203, support rods, an upper angle support 205, tie bars 206, an upright frame 207, a brace, a handlebar 209, a handle grip (not illustrated), and casters 211. The bottom frame 201 can be "U" shaped in the plane approximately parallel with the floor. The bottom frame has a tapered front 201a and an opening that faces toward the rear, or handlebar 209 side of the cart 200. The upper angle support 205 may extend out from the upright frame 207. The upper angle support 205 and the pair of tie bars 206 may extend out just enough to support evenly distributed weight and allow for a tight nesting gap D1 as illustrated in FIG. 7.

In one example, there can be four swivel casters 211 to allow 360 degrees directional motion. In another example, the front pair of casters 211 may be swivel casters, whereas the back pair of casters 212 may be fixed casters. In one example, the front pair of casters 211 may be set back about 7 inches from the front edge of the frame 201.

Figure 6B:
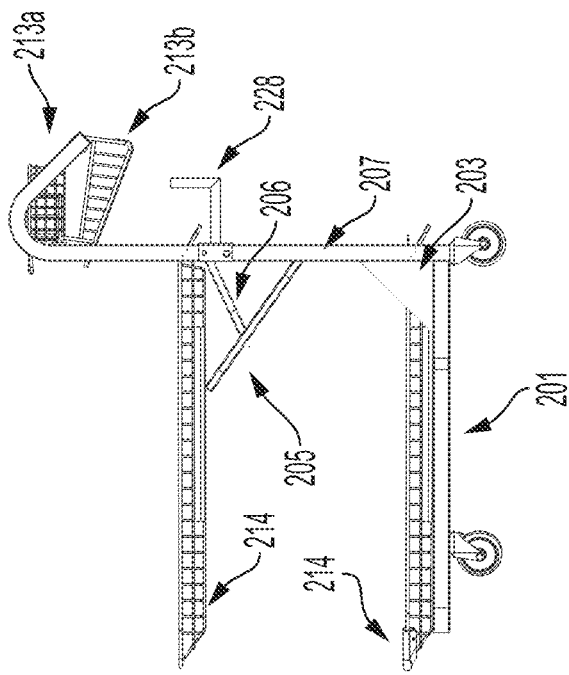
FIGS. 6A-6D illustrate varying views of another example of a nestable shopping cart.
Figure 6D:
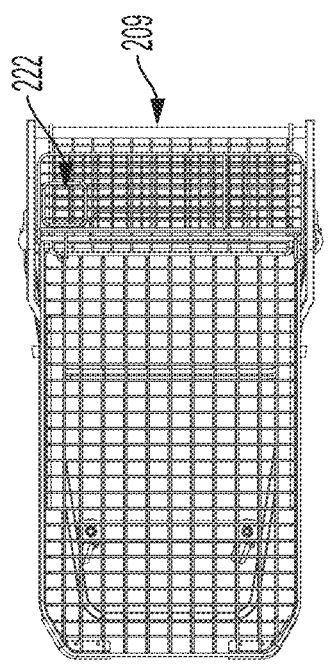
Figure 6C:
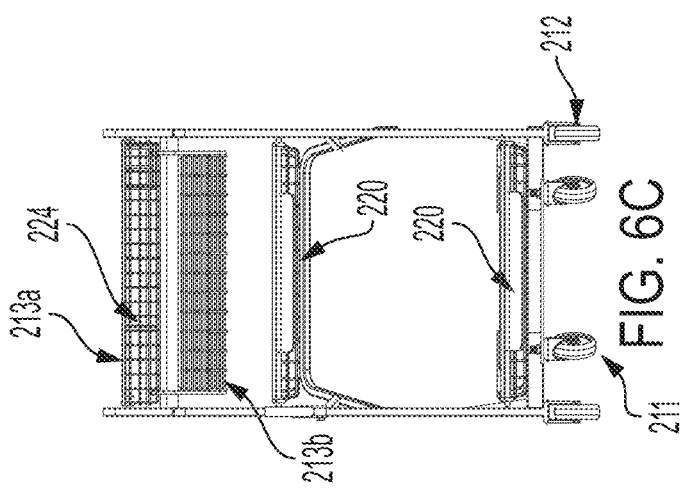
Figure 6A:
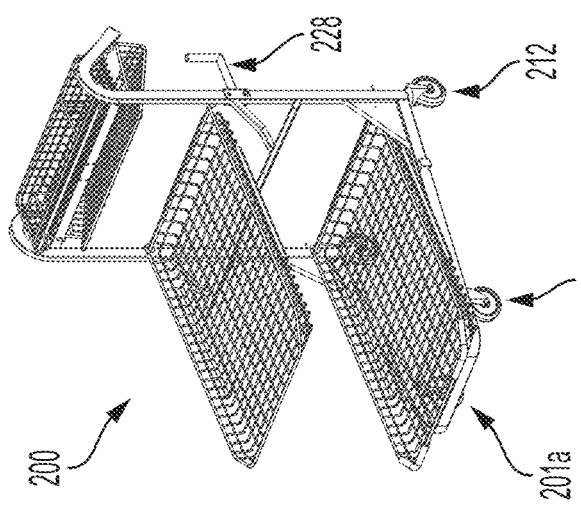
Figure 7:
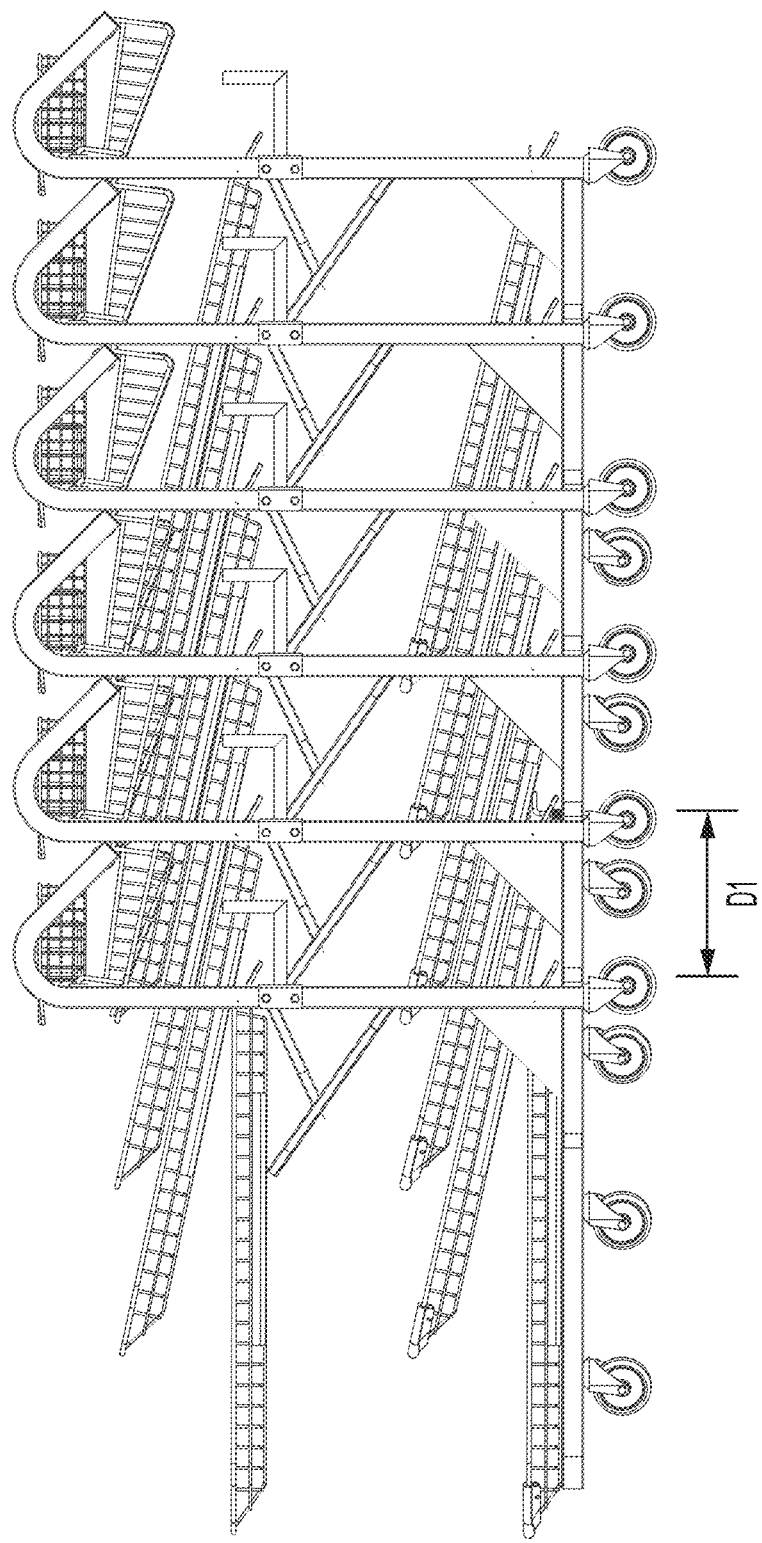
FIG. 7 illustrates a side view of a plurality of the other example of nestable shopping carts in a nesting position according to one aspect of the present disclosure.

Referring to FIG. 6B, the cart 200 may have an upper basket 213a and a lower basket 213b. The upper basket 213a may include a cup holder 222 and at least one storage divider 224. The upper basket 213a can be configured for produce, dairy, or to receive a carton of eggs.

The lower basket 213b can be shaped to allow for storage of grocery bags (not illustrated). As more markets and/or states are mandating that shoppers bring their own bags, this is a convenient place for a user to store them. The upper and lower baskets 213a, 213b can be placed between a "cane" shaped handle head 226 of the upright 207. The cane shape 226 is designed to provide an ergonomic handle position. The end of the cane 226 is fixed to the handle height position for optimal height to reduce shoulder strain and allow for a longer stride by minimizing shin impact on the lower ramp 220. As above, there is also an upper ramp 220 for the upper tray 214.

As above, there can be a pair of trays or shelf baskets 214. Each tray 214 may exhibit a grid steel wire pattern. One tray 214 may be supported by the upper angle support 205 and the other tray 214 may be supported by the bottom frame 201. As shown in FIG. 6B, an approximately vertical spindle 228 can also be provided to hang bag from.

Figure 9A:
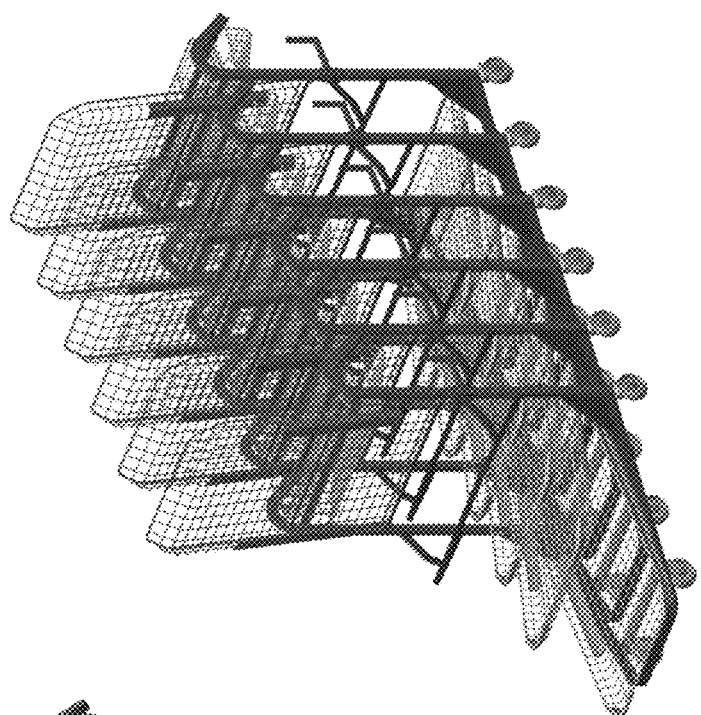
FIGS. 9A-9B illustrate a plurality of the other example of nestable shopping carts with a tray upright nesting position according to one aspect of the present disclosure.
Figure 8:
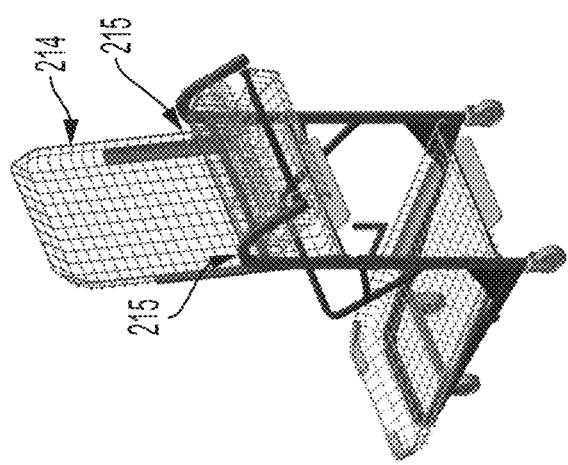
FIG. 8 illustrates a rear side profile of the other example with the tray in the upright position.
Figure 9B:
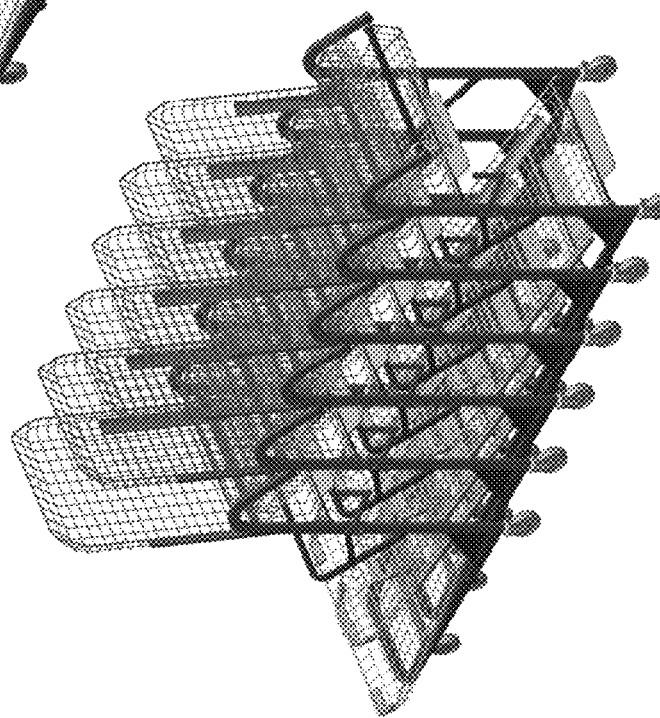

Additionally, FIGS. 7 and 9A-9B illustrate the different nesting configurations, as previously illustrated, FIGS. 9A-9B illustrate a configuration where the top tray 214 is disposed vertical prior to nesting, to allow for a tighter configuration, additional carts, or both. FIG. 8 illustrates the cart 200 alone with the top tray 214 disposed vertically. FIG. 8 further illustrates retaining hooks 215 which are attached at one point to the upright frame 207. They are releasably engaged with the top tray 214 to retain the tray 214 in the upright position. When the tray 214 is in the use or non-nested position, the hooks 215 are disengaged from the tray but still engaged with the upright member 207.

Figure 10:
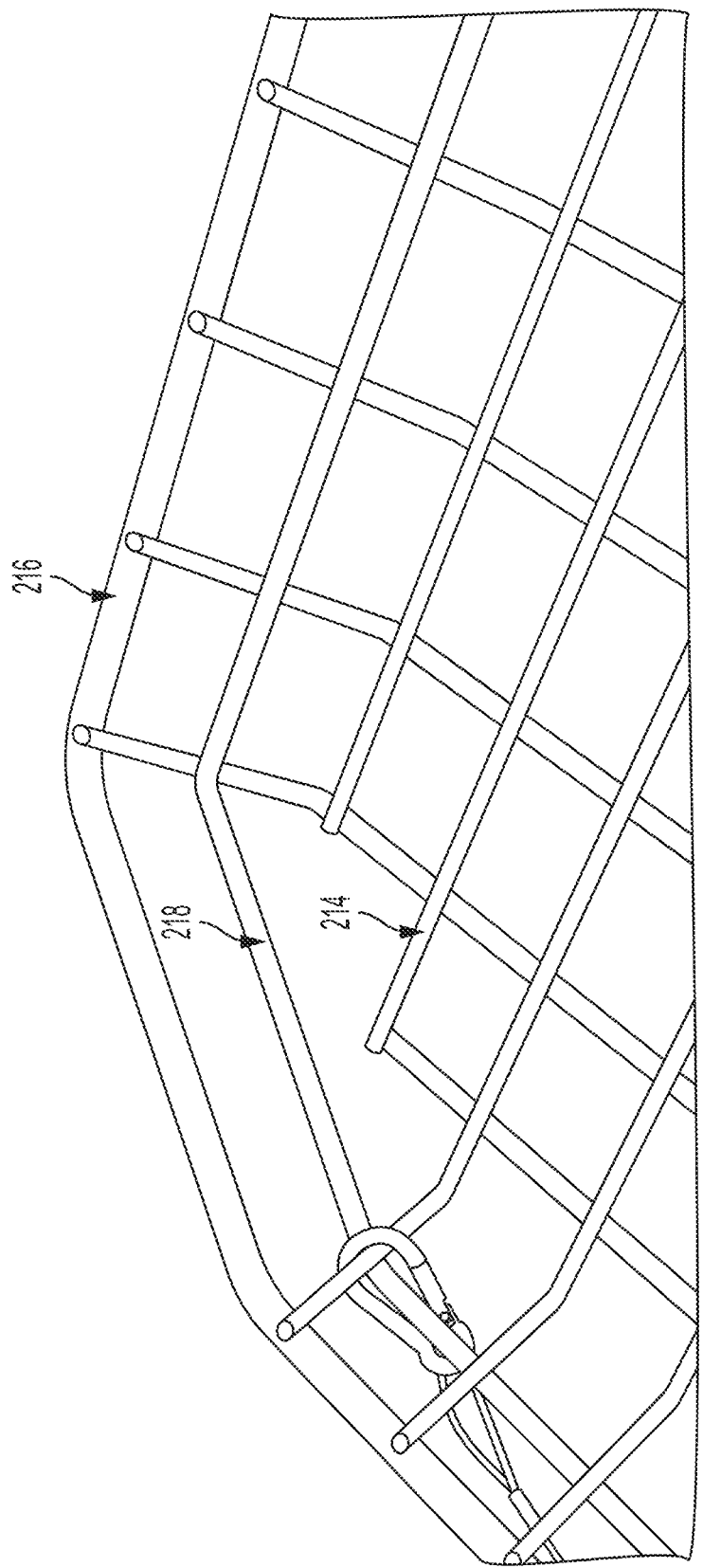
FIG. 10 illustrates an example of a front end of an upper tray.
Figure 11:
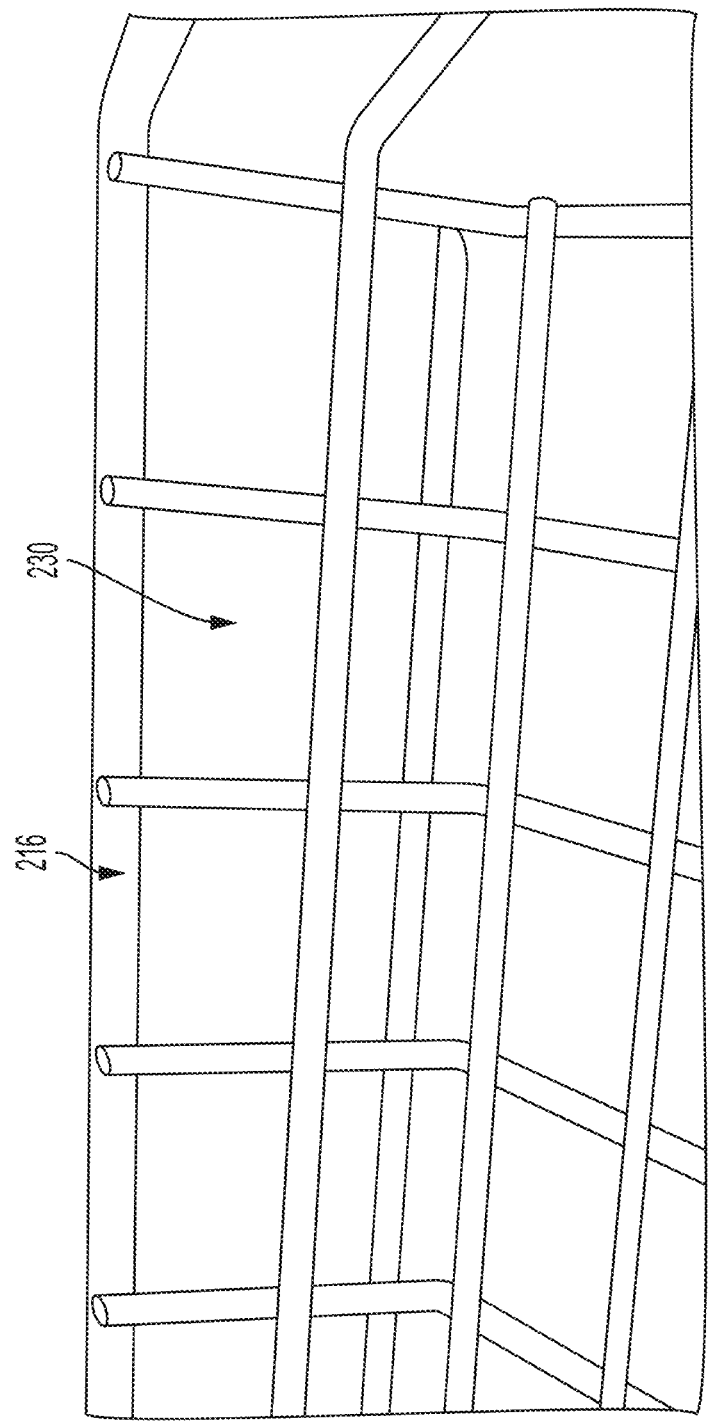
FIG. 11 illustrates another example of a front end of an upper tray.

FIGS. 10 and 11 illustrate two examples of a tapered front 216 configured to aid in nesting. As illustrated in FIG. 10, each tray 214 can have a perimeter wire 218 for added structural support. In this example the perimeter wire 218 extends along the outside of the tray 214 until it reaches the front 216. Here, the perimeter wire 218 is now "woven" into the interior of the tray 214. In the example, as the wire 218 rounds the "corner" it transitions from outside to inside. This permits the front 216 to be smooth and has nothing on its face to catch the ramp 220 of the forward cart 200 when being nested.

FIG. 11 illustrates a different example to smooth the transition face of the front 216. Here a face plate 230 is attached to the front 216. This again leaves a smooth surface to prevent catching on the forward cart's 200 ramp 220.

Other features and elements as described in the cart 100 above, can be present in this example cart 200. Further, while the above carts 100, 200 can be used by regular shoppers, they can also be optimized for "pickers". Current shopping trends now have employees shopping for one or more customers who have placed their orders remotely (via phone, text, on-line, etc.). In this instance, the carts 100, 200 can designed to accommodate up to 18 grocery bags (nine each tray 120, 220). That way, as the picker navigates the cart 100, 200 through the aisles of the store they can fulfill multiple orders at once. In one example, the picker fills the bags situated on the top tray 120, 220, and moves them to the bottom tray 120, 220 and then removes additional bags from the lower basket 213b and sets them into the upper tray 120, 220 for continued order fulfillment.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A nestable shopping cart, comprising:
    an upright frame;
    a tray pivotally connected to the upright frame, comprising:
        a utility position;
        a nested position;
        an inside;
        an outside;
        a perimeter wire surrounding the tray; and
        a tapered front;
    wherein the perimeter wire surrounds the outside of the tray until the tapered front, and
    wherein the perimeter wire surrounds the inside of the tapered front.

2. The nestable shopping cart of claim 1, wherein the tapered front forms an angle of about 35 degrees.

3. The nestable shopping cart of claim 1, wherein the nestable shopping cart is configured to be nested within the another nestable shopping cart in a line.

4. The nestable shopping cart of claim 1, wherein the tray exhibits a grid steel wire pattern.

5. The nestable shopping cart of claim 1, wherein the perimeter wire defines a diameter of about 5/6 inches.

6. A nestable shopping cart, comprising:
    an upright frame;
    a tray pivotally connected to the upright frame, comprising:
        a utility position;
        a nested position;
        an inside;
        an outside;
        a perimeter wire surrounding the tray;
        a tapered front; and
        a face plate attached to the outside at the tapered front;
    wherein the perimeter wire surrounds the outside of the tray until the tapered front, and
    wherein the perimeter wire surrounds the inside of the tapered front.

7. The nestable shopping cart of claim 1, wherein the tapered front forms an angle of about 35 degrees.

8. The nestable shopping cart of claim 1, wherein the nestable shopping cart is configured to be nested within the another nestable shopping cart in a line.

\* \* \* \* \*